(12) United States Patent
Tsunoda et al.

(10) Patent No.: US 7,463,795 B2
(45) Date of Patent: Dec. 9, 2008

(54) ACOUSTO-OPTIC DEVICE

(75) Inventors: Yukito Tsunoda, Kawasaki (JP);
Hiroshi Miyata, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 122 days.

(21) Appl. No.: 10/981,561

(22) Filed: Nov. 5, 2004

(65) Prior Publication Data
US 2006/0008195 A1      Jan. 12, 2006

(30) Foreign Application Priority Data
Jul. 6, 2004    (JP)    ............... 2004-198919

(51) Int. Cl.
G02F 1/335    (2006.01)
G02F 1/01     (2006.01)
G02F 1/035    (2006.01)
G02B 6/26     (2006.01)
G02B 6/42     (2006.01)

(52) U.S. Cl. .................. 385/7; 385/1; 385/2; 385/3; 385/4; 385/15; 385/28; 385/39; 385/40; 385/41; 385/42

(58) Field of Classification Search ............... 385/7
See application file for complete search history.

(56) References Cited

U.S. PATENT DOCUMENTS
5,048,936 A * 9/1991 Hatori ..................... 385/7
5,781,669 A * 7/1998 Schmid et al. ............. 385/7

FOREIGN PATENT DOCUMENTS
JP    10-010481    1/1998
JP    11-326855    11/1999
JP    2001-209019    8/2001

* cited by examiner

Primary Examiner—Frank G Font
Assistant Examiner—Ryan Lepisto
(74) Attorney, Agent, or Firm—Staas & Halsey LLP

(57) ABSTRACT

The present invention relates to an acousto-optic device capable of extending the frequency band of SAWs being able to be generated by it, the acousto-optic device comprising: a light propagation unit for propagating light; a surface acoustic wave propagation unit capable of propagating a surface acoustic wave causing interaction with light which propagates in the light propagation unit; and a transducer electrode unit provided with a plurality of electrodes configured so as to correspond to a frequency band to be generated as the surface acoustic wave which propagates in the surface acoustic wave propagation unit.

23 Claims, 11 Drawing Sheets

DISTANCE L1
BETWEEN TEETH OF COMB

DISTANCE L2
BETWEEN TEETH OF COMB

ACOUSTO-OPTIC DEVICE

BACKGROUND OF THE INVENTION

1) Field of the Invention

The present invention relates to an acousto-optic device suitably used in an optical communication system.

2) Description of the Related Art

An acousto-optic device is a device utilizing an acousto-optic effect that is an interaction between an ultrasonic wave and light, such as an Acousto-Optic Tunable Filter (AOTF). This AOTF is expected to be used for an optical cross connect, an optical switch, light modulation, or the like in addition to an Optical Add-Drop Multiplexer (OADM) in a Wavelength Division Multiplexing (WDM) optical communication system.

An acousto-optic wavelength tunable filter is a wavelength filter using a TE-TM mode conversion caused by an acousto-optic effect that is an interaction between light in an optical waveguide made on a piezoelectric material such as a lithium niobate ($LiNbO_3$) substrate (hereinafter simply referred to LN substrate in some cases), and a Surface Acoustic Wave (SAW) applied onto it.

FIG. 17 is a schematic top view showing a configuration example of a typical AOTF. In this AOTF 100, on an LN substrate 101, a mode conversion unit 103 as an interaction region is formed which comprises of two optical waveguides 103a-1, 103a-2 and a surface acoustic wave guide 103b that is a SAW waveguide made of a thin film formed on the optical waveguides. Polarization beam splitters 102, 104 are formed before and after the mode conversion unit 103 respectively. In addition, a pair of comb electrodes (IDT: Inter Digit Transducer) 105 is formed capable of generating a SAW, which is propagated in the surface acoustic wave guide 103b, when an ultrasonic wave signal [e.g., radio frequency (RF) signal] is applied to it.

In the AOTF 100 configured like this, light inputted is split into TE light and TM light by a polarization beam splitter 102 located at the input side, and then a SAW derived from the comb electrode 105 makes TE/ME conversion to the light having a specific wavelength independently at the optical waveguides 103a-1, 103a-2, and the polarization beam splitter 104 located at the output side performs wave combination. Thus, a device characteristic having no polarization dependence is realized.

Furthermore, in the AOTF 100 described above, there is a correspondence between an optical wavelength for which TE/TM mode conversion is performed and the frequency of a SAW, so that an optical wavelength for which TE/TM mode conversion is performed can be tuned by changing the frequency of the SAW. Specifically, changing an RF signal applied to the IDT 105 for SAW excitation changes the frequency of the SAW excited, and thereby an optical wavelength to which TE/TM mode conversion is performed can be tuned.

Another configuration example of an AOTF is a directional coupling type AOTF 100A as shown in FIG. 18. In this AOTF 100A, an IDT 105A is provided at the left side of the direction of light propagation on the upper reaches of the optical waveguides 103a-1, 103a-2, and two parallel surface acoustic wave guides 103b-1, 103b-2 are provided, in order that a SAW generated by applying an RF signal to the IDT 105A is directionally coupled from the surface acoustic wave guide 103b-1 to the surface acoustic wave guide 103b-2 formed on the optical waveguides 103a-1, 103a-2. In other words, the area of the surface acoustic wave guide 103b-2 formed on the optical waveguides 103a-1, 103a-2 is defined as an interaction area 103A. The same notations in FIG. 18 as ones in FIG. 17 represent substantially similar portions.

Moreover, publicly known arts related to the present invention include ones described in the patent documents 1 to 3 listed below.

In the patent document 1, an acousto-optic tunable filter is described in which the center of the converter causing an acoustic wave beam in response to an electric signal is positioned at one side of the optical axis, and the axis of the acoustic wave beam crosses the optical axis at an oblique angle, in order to reduce side lobes without adding any process stage unnecessary for the manufacture.

In the patent document 2, an optical wavelength variable filter is described which is provided with a distortion adding unit in order to obtain a filter characteristic having a little asymmetry about the central wavelength.

In the patent document 3, an acousto-optic type variable wavelength TE/TM mode converter capable of simultaneously selecting light having multiple wavelengths adjacent to each other, while avoiding the increase of power of a high frequency electric signal.

[Patent Document 1] Japanese Patent Laid-Open (Kokai) NO. HEI 10-10481

[Patent Document 2] Japanese Patent Laid-Open (Kokai) NO. HEI 11-326855

[Patent Document 3] Japanese Patent Laid-Open (Kokai) NO. 2001-209019

However, an acousto-optic device like the AOTF 100 shown in FIG. 17 described above has a problem that because of a limitation on a band which can be generated as a SAW, when it is used as an AOTF, there is a limitation on the range of tunable optical wavelengths to which mode conversion is performed, so that it is difficult to extend the range of tunable optical wavelengths.

That is, in the AOTF 100 shown in FIG. 17, there are adequate frequency ranges in the domain of frequencies applied to the IDT 105 to generate a SAW and in the domain of frequencies capable of propagating in the surface acoustic wave guide 103b, respectively, so that the range of tunable optical wavelengths about optical wavelengths to which mode conversion is performed by the AOTF 100 described above is also decided in connection with the adequate frequency ranges of the IDT 105 and surface acoustic wave guide 103b.

FIG. 19 shows an example of the relationship between the frequency (horizontal axis) of an electric signal having a constant amplitude applied to the IDT 105 to generate a SAW and the intensity (vertical axis) of a SAW excited correspondingly. For generating a SAW having a specified intensity in a range below a value PM specified as the upper limit of power consumption as shown in FIG. 19, the frequency of the electric signal is limited to the band B1 corresponding to FIG. 19 described above as shown in FIG. 20.

That is, the efficiency of exciting a SAW of the IDT 105 has a large dependence on the frequency of an electric signal applied to the IDT 105. It is known that the frequency of an electric signal supplied to the IDT 105 is reflected in the frequency characteristic of a SAW excited.

In other words, when the power consumption of the power source, which is not shown, for supplying an electric signal to the IDT 105, and the SAW intensity necessary for mode conversion are taken into consideration, the frequency band of RF signals which can be supplied to the IDT 105 is limited to the band B1 shown in FIGS. 19 and 20, and the frequency band of SAWs is also limited to a band corresponding to the band B1.
}

Furthermore, in the AOTF 100A shown in FIG. 18 described above, the IDT 105A usually excites a SAW of zero order mode, but a SAW excited by the IDT 105A has a limitation on the range of wavelengths which couple to the surface acoustic wave guide 103b-2 as shown in FIG. 21 for example. Because of this, a directional coupling type acousto-optic device also has a limitation on the frequency range of SAWs based on the range of frequencies coupling completely.

In this connection, point C in FIG. 21 represents a case that a SAW of zero order mode excited by the IDT 105A has a wavelength that couples to the surface acoustic wave guide 103b-2 at the downstream end of it. That is, point C represents that a SAW excited by the IDT 105A is required to have a length which is two times as long as that of the surface acoustic wave guides 103b-1, 103b-2 in order to return (completely couple) onto the original axis of the SAW 103b-1.

Furthermore, point D represents a case that a SAW of zero order mode excited by the IDT 105A has a wavelength that couples to the surface acoustic wave guide 103b-2 at the intermediate portion of it. That is, point D represents that the SAW is required to have the same length as that of the surface acoustic wave guides 103b-1, 103b-2 for complete coupling. Thus, as shown in FIG. 21, only SAWs, of SAWs of zero order mode excited by the IDT 105A, having wavelengths (or frequencies) between a SAW wavelength corresponding to point C and a SAW wavelength (or SAW frequency) corresponding to point D can be used. This limitation on SAW wavelength is directly linked to the limitations of optical wavelengths to which mode conversion is possible.

It is therefore desirable to reduce the limitations of wavelengths of SAWs to be generated in order to extend the range of optical wavelengths to which mode conversion is possible.

In the patent documents 1 to 3 described above, any technique for extending the band of wavelengths of SAWs as described above is not described. In the technique described in the patent document 3, adjacent frequencies are applied to different comb electrodes, but the band B1 of RF frequencies are as shown in FIG. 19 described above, that is, the band of SAW frequencies, can not be extended.

SUMMARY OF THE INVENTION

The present invention has been developed in view of such problems, and aims to provide an acousto-optic device capable of extending the frequency band of SAWs being able to be generated.

For this purpose, an acousto-optic device according to the present invention comprises: a light propagation unit for propagating light; a surface acoustic wave propagation unit capable of propagating a surface acoustic wave causing interaction with light which propagates in said light propagation unit; and a transducer electrode unit provided with a plurality of electrodes configured so as to correspond to a frequency band to be generated as said surface acoustic wave which propagates in said surface acoustic wave propagation unit.

It is preferable that said electrodes comprise of a plurality of pairs of comb electrodes, and each of said pairs of comb electrodes is configured so as to have a distance between teeth different from each other, corresponding to a frequency band to be generated as said surface acoustic wave which propagates in the surface acoustic wave propagation unit.

Furthermore, it is also possible that said surface acoustic wave propagation unit is provided with a surface acoustic wave guide which is so configured that said surface acoustic wave to be generated makes a directional coupling to said light propagation unit; and each of said plurality of electrodes is configured, corresponding to a frequency band to be generated as said surface acoustic wave which propagates in the surface acoustic wave guide, so as to be able to generate a surface acoustic wave having a different kind of mode order from each other.

In this case, said plurality of electrodes may include at least two pairs of comb electrodes in which comb electrode patterns are so formed that surface acoustic waves to be generated have opposite phases.

It is also possible to provide a phase shifter for making an electric signal applied to a first electrode of said plurality of electrodes from an electric signal source and an electric signal applied to a second electrode of said plurality of electrodes from said electric signal source to have opposite phases.

Like this, according to the present invention, a plurality of electrodes configured so as to correspond to a frequency band to be generated as a surface acoustic wave are provided, which provides an advantage that a frequency band which can be generated as a surface acoustic wave can also be extended.

In particular, according to the present invention, the electrodes comprise of a plurality of pairs of comb electrodes, and said pairs of comb electrodes have distances between teeth different from each other, corresponding to a frequency band to be generated as a surface acoustic wave propagating in said surface acoustic wave propagation unit, which provides an advantage that a frequency band which can be generated as a surface acoustic wave can also be extended by extending the frequency band of RF signals which can be supplied for excitation of surface acoustic waves.

Furthermore, according to the present invention, a plurality of pairs of comb electrodes configured so as to correspond to a frequency band to be generated as a surface acoustic wave are so configured, corresponding to a frequency band to be generated as a surface acoustic wave which propagates in the surface acoustic wave guide, so as to be able to generate a surface acoustic wave having a different kind of mode order from each other, which provides an advantage that a frequency band of SAWs being able to be excited can be extended to a (high frequency) range to which it has not conventionally been extended.

The above and other objects, features and advantageous of the present invention will become apparent from the following description and the appended claims, taken in conjunction with the accompanying drawings in which like parts or elements are denoted by like reference characters.

DESCRIPTION OF THE PREFERRED EMBODIMENTS

Embodiments of the present invention are described below with reference to the drawings.

[A1] First Embodiment

Figure 1:
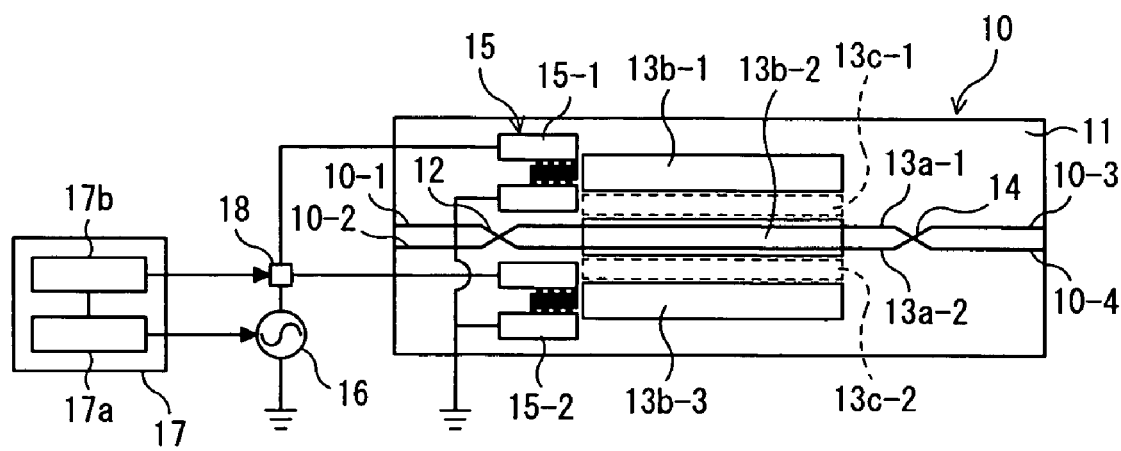
FIG. 1 shows an acousto-optic device according to the first embodiment of the present invention.

FIG. 1 shows an acousto-optic device according to the first embodiment of the present invention. The acousto-optic device 10 shown in FIG. 1 is provided with a substrate 11 having birefringence and acousto-optic effect such as an LN substrate on which polarization beam splitters 12, 14, two parallel optical waveguides 13a-1, 13a-2, surface acoustic wave guides 13b-1 to 13b-3, and a transducer electrode unit 15 are formed, and is designed to be able to be used as an acousto-optic tunable filter (AOTF) for example.

In the figure, reference numeral 16 denotes an RF electric source as an electric signal source capable of generating an electric signal (RF signal having RF frequency) to be applied to the transducer electrode unit 15, reference numeral 17 denotes an RF signal control unit capable of controlling the apply of an electric signal from the RF electric source 16 to the transducer electrode unit 15, and reference numeral 18 denotes a change-over switch for controlling the supply of an electric signal from the RF electric source 16 to the transducer electrode unit 15.

The polarization beam splitter 12 is used to split light from at least one input port 10-1 of the two input ports 10-1, 10-2 provided in the acousto-optic device 10 into two polarized waves (e.g., TE light and TM light). Furthermore, the optical waveguides 13a-1, 13a-2 are designed to propagate light polarized and split by the polarization beam splitter 12 to output the polarization beam splitter 14. The polarization beam splitter 14 is used to split light inputted from the optical waveguides 13a-1, 13a-2 into two polarized waves to output them (separately in output directions stipulated every polarized wave). Thus, the optical waveguides 12, 14, 13a-1, 13a-2 described above are configured as optical waveguides for propagating light.

Each of the surface acoustic wave guides 13b-1 to 13b-3 is a thin film or a region formed by diffusing metal such as titanium. The surface acoustic wave guides 13b-1, 13b-3 are formed, in the right and left regions of the direction of light propagation, with a predetermined distance between the parallel optical waveguides 13a-1, 13a-2 respectively in substrate 11, and the surface acoustic wave guide 13b-2 is formed in a region on the two parallel optical waveguides 13a-1, 13a-2. These surface acoustic wave guides 13b-1 to 13b-3 are configured as directional coupling type surface acoustic wave guides.

In addition, the transducer electrode unit 15 is used to excite (generate) SAWs capable of propagating in the surface acoustic wave guides 13b-1 to 13b-3 and the regions 13c-1, 13c-2 lying between the surface acoustic wave guides 13b-1, 13b-2 and between surface acoustic wave guides 13b-2, 13b-3 respectively, and is provided with two pairs of comb electrodes 15-1, 15-2 having comb teeth patterns corresponding to frequency bands to be generated as SAWs which propagate in the surface acoustic wave guides 13b-1 to 13b-3 and the regions 13c-1, 13c-2.

That is, a SAW excited by the pair of comb electrodes 15-1 directionally couples from the surface acoustic wave guide 13b-1 to the surface acoustic wave guide 13b-2 on the parallel optical waveguides 13a-1, 13a-2 through the region 13c-1, and similarly, a SAW excited by the pair of comb electrodes 15-2 directionally couples from the surface acoustic wave guide 13b-3 to the surface acoustic wave guide 13b-2 through the region 13c-2.

Figure 2A:
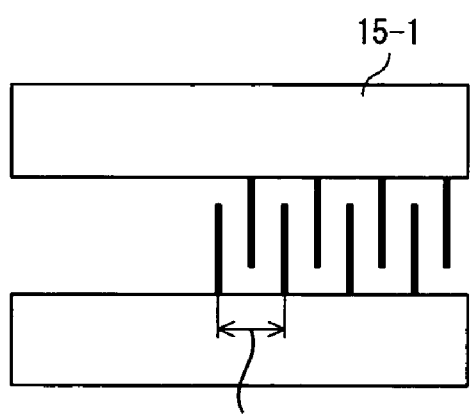
FIGS. 2(A) and 2(B) show pairs of comb electrodes having distances between teeth which vary according to frequency bands of SAWs to be generated.
Figure 2B:
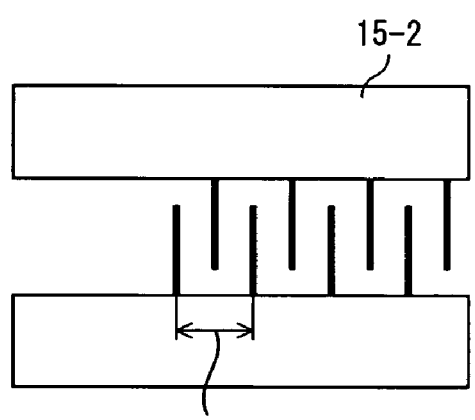

Furthermore, each of the pairs of comb electrodes 15-1, 15-2 comprises a pair of interdigitated electrodes disposed so as to face each other, and has a distance between teeth corresponding to the frequency band of SAWs to be generated as shown in FIGS. 2(A) and 2(B) for example. That is, as shown in FIG. 2(A), one of the pairs of comb electrodes 15-1 has a distance L1 between each two adjacent teeth, and, as shown in FIG. 2(B), the other of the pairs of comb electrodes 15-2 has a distance L2 between each two adjacent teeth larger than the distance L1.

Figure 3:
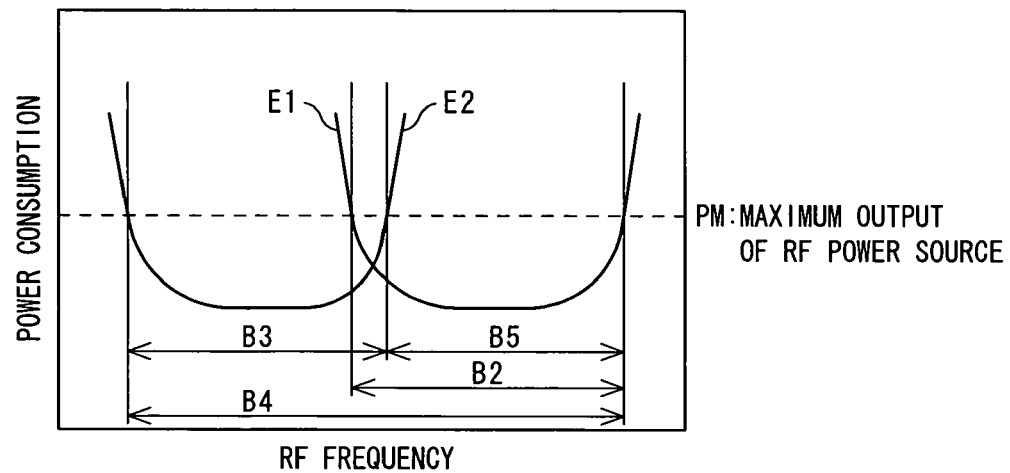
FIG. 3 depicts an operation and effect of the first embodiment.
Figure 19:
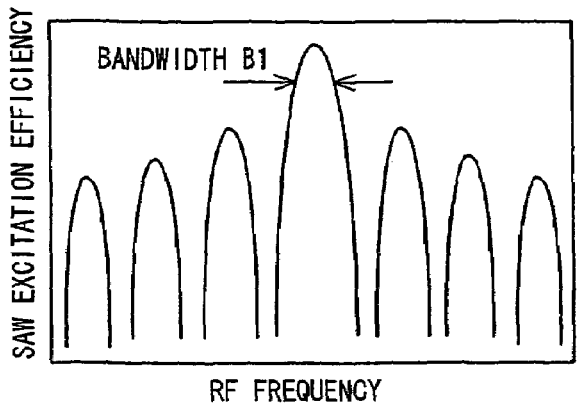
FIG. 19 depicts a problem to be solved on the AOTFs shown in FIGS. 17 and 18.
Figure 20:
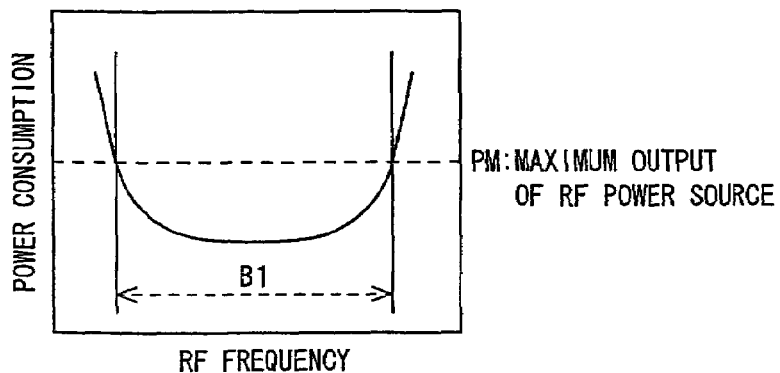
FIG. 20 depicts a problem to be solved on the AOTFs shown in FIGS. 17 and 18.
Figure 21:
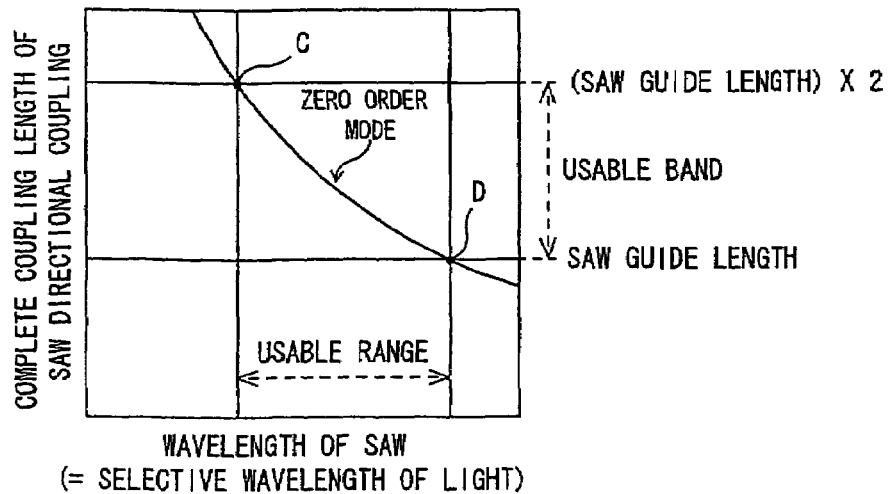
FIG. 21 depicts a problem to be solved on the AOTF shown in FIG. 18.

In such pairs of comb electrodes 15-1, 15-2 having distances between teeth different from each other, center frequencies in the domains of RF signals (refer to B1 in FIGS. 19 and 20) usable for SAW generation can be different from each other as shown in FIG. 3. That is, relations between frequencies of RF signals to be applied to the pair of comb electrodes 15-1 having a relatively short distance L1 between teeth and power consumptions for generating SAWs having predetermined strengths are represented by the distribution E1, and relations between frequencies of RF signals to be applied to the pair of comb electrodes 15-2 having a relatively long distance L2 between teeth and power consumptions for generating SAWs having predetermined strengths are represented by the distribution E2 having a center frequency lower than that of the distribution E1.

In the above relations between RF frequency bands and power consumptions for generating SAWs, when the maximum power PM which can be supplied from the RF source 16 is taken into consideration, a frequency band which can be supplied to the pair of comb electrode 15-1 becomes B2 shown in FIG. 3, and a frequency band which can be supplied to the pair of comb electrode 15-2 becomes B3 shown in FIG. 3. Thus, the frequency band of RF signals being able to be supplied to the transducer electrode unit 15 can be a band B4 which is a combination of the bands B2 and B3 described above.

As described above, the frequency band of RF signals being able to be supplied to the transducer electrode unit 15 can be extended, so that the frequency band of SAWs excited can also be extended significantly. Thus, when the acousto-optic device 10 is used as an AOTF, the range of optical wavelengths (the range of tunable wavelengths) to which mode conversion is possible can be extended significantly.

Figure 17:
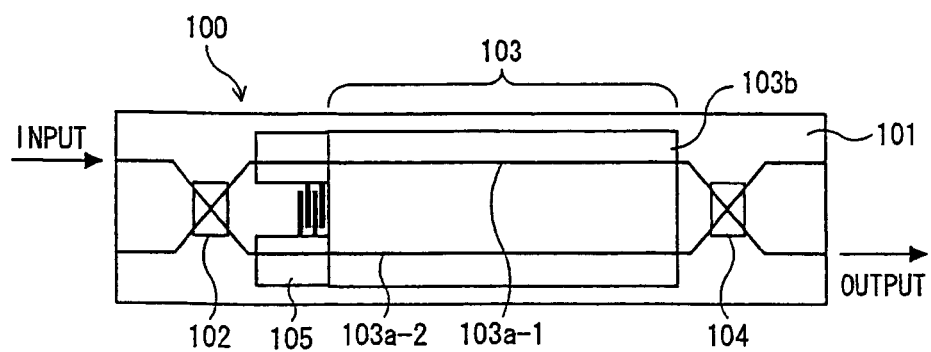
FIG. 17 is a schematic top view showing a configuration example of a typical AOTF.
Figure 18:
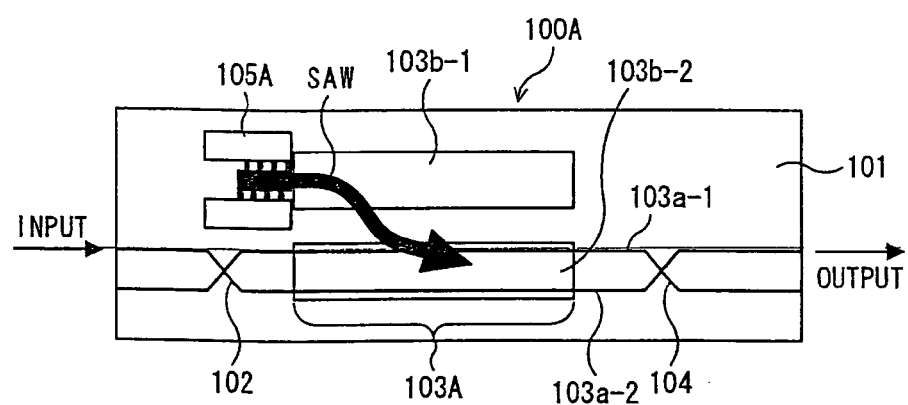
FIG. 18 is a schematic top view showing a configuration example of a typical AOTF.

In other words, each of the pairs of comb electrodes 15-1, 15-2 comprising the transducer electrode unit 15 is so configured that the higher the frequency band to be generated as a SAW becomes, the shorter the distance between teeth becomes, so that RF signals in band B4 wider than B2 corresponding to band B1 being able to be applied to the conventional IDT 105 shown in FIG. 17 can be applied, and thereby the frequency band of SAWs excited can also extended significantly.

Thus, the pair of comb electrodes 15-1 is configured as a first pair of electrodes capable of generating a surface acoustic wave in a second frequency band when an electric signal in band B5 which is a first frequency band is applied to it, and the pair of comb electrodes 15-2 is configured as a second pair of electrodes capable of generating a surface acoustic wave in a fourth frequency band different from a second frequency band when an electric signal in the third frequency band B3 different from the first frequency band B5 is applied to it.

By the way, the RF signal control unit 17 described above functions as a control unit for controlling the supply of an electric signal generated by the RF electric source 16 to either the pair of comb electrodes 15-1 or the pair of comb electrodes 15-2 according to a frequency band to be generated as a SAW. Specifically, the RF signal control unit 17 comprises a frequency setting control unit 17a for controlling the RF electric source 16 to set the frequency of an electric signal to be supplied to the transducer electrode unit 15, and a switching control unit 17b for performing switching control in order to output an electric signal having said frequency set by the frequency setting control unit 17a to either of the pairs of comb electrodes 15-1, 15-2.

The change-over switch 18 selectively outputs an electric signal from the RF electric source 16 to either of the pairs of comb electrodes 15-1, 15-2 on the basis of the switching signal from the switching control unit 17b. That is, the change-over switch 18 supplies an RF signal from RF electric source 16, on the basis of a switching control signal from the switching control unit 17b of the RF signal control unit 17, to the pair of comb electrodes 15-2 for generating low frequencies when the RF signal is in the frequency band B3 shown in FIG. 3, or to the pair of comb electrodes 15-1 for generating high frequencies when the RF signal is in the band B5 higher than the frequency band B3 in the frequency band B4.

In FIG. 3 described above, the frequency band B2 of RF signals being able to be supplied to the pair of electrodes 15-1, and the frequency band B3 of RF signals being able to be supplied to the pair of electrodes 15-2 overlap each other. In the first embodiment, for RF signals in the overlapping region, the pair of electrodes 15-2 is preferentially used, but the pair of electrodes 15-1 may of course be used. The overlapping region which is a frequency band of RF signals being able to be supplied to both of the pairs of electrodes 15-1, 15-2 may be eliminated or enlarged.

Because of the configuration described above, the acousto-optic device 10 according to the first embodiment of the present invention may be operated as, for example, an AOTF performing TE/TM mode conversion.

Specifically, when light is input from the input port 10-1, the inputted light is polarized and split to TE light and TM light by the polarization beam splitter 12. The polarized and split TM light propagates in the parallel optical waveguide 13a-1, and the TE light propagates in the parallel optical waveguide 13a-2.

TE/TM mode conversion of light having a predetermined wavelength of light propagating in the parallel optical waveguides 13a-1, 13a-2 is performed by interaction with a SAW excited by an RF signal applied to either of the pairs of comb electrodes 15-1, 15-2 comprising the transducer electrode unit 15. That is, an optical wavelength to which mode conversion is performed in the AOTF is set according to the frequency of an RF signal supplied to the transducer electrode unit 15 for SAW generation.

Thus, of light polarized and synthesized by the polarization beam splitter 14, light having a wavelength to which mode conversion has been performed by interaction with a SAW is output from one output port 10-4 of the output ports 10-3, 10-4 of the acousto-optic device 10, and light having a wavelength to which mode conversion has not been performed is output from the other output port 10-3.

Since the two pairs of comb electrodes 15-1, 15-2 having different distances between teeth are provided, either of the pairs of comb electrodes 15-1, 15-2 to which an RF signal from the RF electric source 16 is applied can be selected, according to the frequency band of the RF signal from RF electric source 16, by the control of the RF signal control unit 17, in order to extend the frequency band of RF signals being able to be applied for SAW excitation, which results in that the frequency band of SAWs being able to be excited can also be extended.

That is, since the frequency band of SAWs can be extended, it becomes possible to extend the tunable band of optical wavelengths for performing mode conversion in case that the acousto-optic device 10 is used as an AOTF.

As described above, the acousto-optic device 10 according to the first embodiment of the present invention comprises the pairs of comb electrodes 15-1, 15-2 having distances between teeth different from each other, which are pairs of electrodes configured so as to correspond to a frequency band to be generated as a surface acoustic wave, so that the frequency band of RF signals being able to be supplied for SAW excitation can be extended, which provides an advantage that the frequency band being able to be generated as a SAW can also be extended.

[A2] First Variation of First Embodiment

Figure 4:
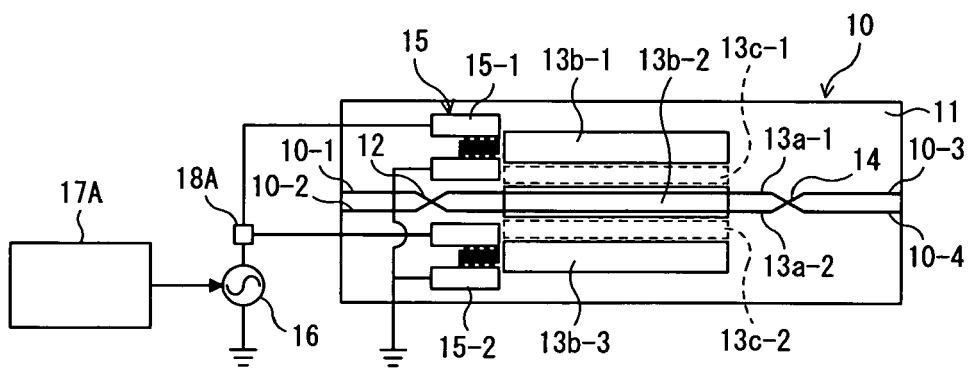
FIG. 4 shows an acousto-optic device according to the first variation of the first embodiment of the present invention.

The first embodiment shown in FIG. 1 described above comprises the change-over switch 18 and the RF signal control unit 17 having a function of controlling the RF electric source 16 and the change-over switch 18 in order to selectively supply an RF signal, according to its frequency band, to either of the pairs of comb electrodes 15-1, 15-2 comprising the transducer electrode unit 15, but may comprises a bandpass filter 18A and an RF signal control unit 17A as shown in FIG. 4 for example. The same notations in FIG. 4 as ones in FIG. 1 represent similar portions.

The bandpass filter/splitter 18A functions as a selectively outputting unit for selectively outputting an electric signal from the RF electric source 16 to either of the pairs of comb electrodes 15-1, 15-2 according to the frequency of the electric signal. That is, the frequency band of an electric signal inputted from the RF electric source 16 is discriminated in order that an electric signal of the relatively higher frequency band B5 shown in FIG. 3 described above is supplied to the pair of comb electrodes 15-1 having a relatively short distance between teeth, and an electric signal of the relatively lower frequency band B3 is supplied to the pair of comb electrodes 15-2 having a relatively long distance between teeth.

The RF signal control unit 17A is configured as a frequency setting control unit for controlling the RF electric source 16 so as to set the frequency of an electric signal to be supplied to the transducer electrode unit 15. That is, the RF signal control unit 17A may not have a function of controlling the bandpass filter/splitter 18A.

Thus, also in the first variation of the first embodiment, an electric signal can be selectively output, by the RF signal control unit 17A and the bandpass filter/splitter 18A, to either of the pairs of comb electrodes 15-1, 15-2 comprising the transducer electrode unit 15 according to its frequency, which provides an advantage similar to that of the first embodiment described above.

[A3] Second Variation of First Embodiment

Figure 5:
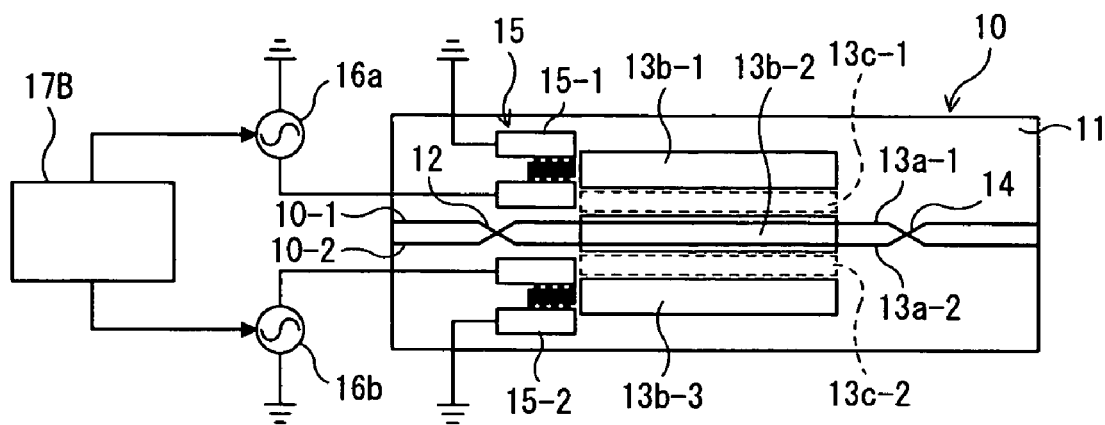
FIG. 5 shows an acousto-optic device according to the second variation of the first embodiment of the present invention.

In the case shown in FIG. 1 or FIG. 4 described above, an RF signal generated by the single RF electric source 16 is supplied to either of the two pairs of comb electrodes 15-1, 15-2 by the change-over switch 18 or the bandpass filter/splitter 18A. However, according to this invention, as shown in FIG. 5 for example, separate RF electric sources 16a, 16b may be provided for the pair of comb electrodes 15-1 and the pair of comb electrodes 15-2 respectively. The same notations in FIG. 5 as ones in FIG. 1 represent similar portions.

The RF electric source 16a which is a first electric signal source is used to generate a relatively high frequency electric signal having the frequency band B5 shown in FIG. 3 described above, and the RF electric source 16b which is a second electric signal source is used to generate a relatively low frequency electric signal having the frequency band B3 shown in FIG. 3 described above. The RF signal control unit 17B is an electric signal source switching control unit for controlling the RF electric sources 16a, 16b so that an electric signal is generated for either of the pairs of comb electrodes 15-1, 15-2.

Thus, also in the second variation of the first embodiment, an electric signal can be selectively output, by the RF electric sources 16a, 16b and the RF signal control unit 17B, to either of the pairs of comb electrodes 15-1, 15-2 comprising the transducer electrode unit 15 according to its frequency, which provides an advantage similar to that of the first embodiment described above.

[A4] Third Variation of First Embodiment

Figure 6:
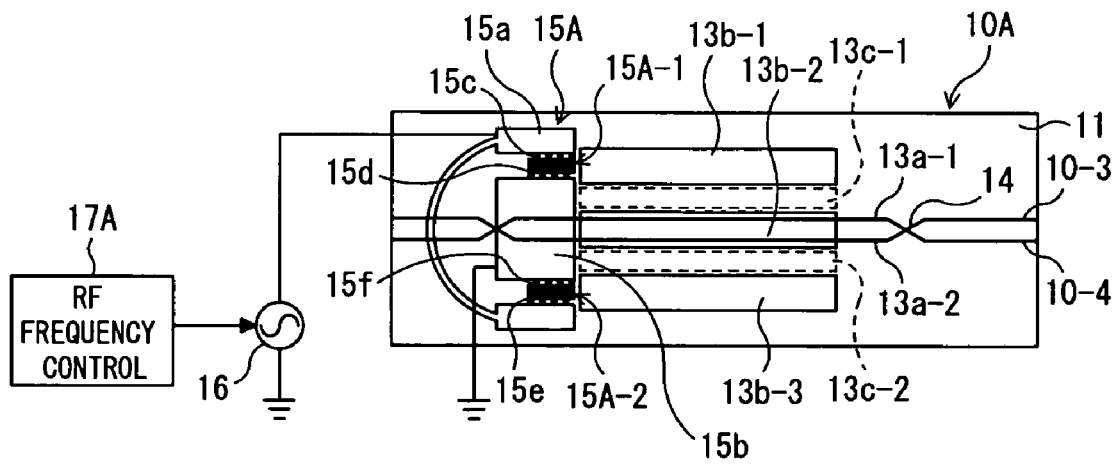
FIG. 6 shows an acousto-optic device according to the third variation of the first embodiment of the present invention.

In the case shown in FIG. 1, FIG. 4, or FIG. 5, the transducer electrode unit 15 comprises of the two independent pairs of comb electrodes 15-1, 15-2, but may be a transducer electrode unit 15A, like an acousto-optic device 10A shown in FIG. 6 for example, compriseing of electrodes sharing the functions of two pairs of comb electrodes. The same notations in FIG. 6 as ones in FIG. 1 represent similar portions.

The transducer electrode unit 15A shown in FIG. 6 comprises a root electrode 15a which is formed in one piece so as to communicate with both of the right and left sides of the light propagation direction of the parallel optical waveguides 13a-1, 13a-2, a root electrode 15b which is formed in the position between the optical waveguides 13a-1 and 13a-2, and tooth electrodes 15c to 15f.

That is, the tooth electrode 15c is formed with the root electrode 15a in one piece, and has a relatively short distance between teeth. [see L1 shown in FIG. 2(A)]. The tooth electrode 15d is formed with the root electrode 15b in one piece so as to interdigitate with the tooth electrode 15c, and has the same distance L1 between teeth as that of the tooth electrode 15c. Thus, the root electrodes 15a, 15b and the tooth electrodes 15c, 15d described above comprise the first pair of comb electrodes 15A-1 which is formed at the left side of the direction of light propagation on the upper reaches of the optical waveguides 13a-1, 13a-2 and has a relatively short distance between teeth.

Furthermore, the tooth electrode 15e is formed with the root electrode 15a in one piece, and has a relatively long distance between teeth [see L2 shown in FIG. 2(B)]. The tooth electrode 15f is formed with the root electrode 15b in one piece so as to interdigitate with the tooth electrode 15e, and has the same distance L2 between teeth as that of the tooth electrode 15e. Thus, the root electrodes 15a, 15b and the tooth electrodes 15e, 15f described above comprise the second pair of comb electrodes 15A-2 which is formed at the right side of the direction of light propagation on the upper reaches of the optical waveguides 13a-1, 13a-2 and has a relatively long distance between teeth.

Thus, the first pair of comb electrodes 15A-1 and the second pair of comb electrodes 15A-2 described above are configured to share the root electrodes 15a, 15b respectively, so that an RF signal supplied to the root electrode 15a can be commonly used as RF signals for the first pair of comb electrodes 15A-1 and second pair of comb electrodes 15A-2. That is, the RF signal control unit 17A which is a frequency setting control unit for setting the frequency of an RF signal generated by the RF electric source 16 can be commonly used for the first and second pairs of comb electrodes 15A-1, 15A-2.

Furthermore, a SAW excited by the pair of comb electrodes 15A-1 can be directionally coupled from the surface acoustic wave guide 13b-1 to the surface acoustic wave guide 13b-2 through the region 13c-1, and similarly a SAW excited by the pair of comb electrodes 15A-2 can be directionally coupled from the surface acoustic wave guide 13b-3 to the surface acoustic wave guide 13b-2 through the region 13c-2.

Figure 7:
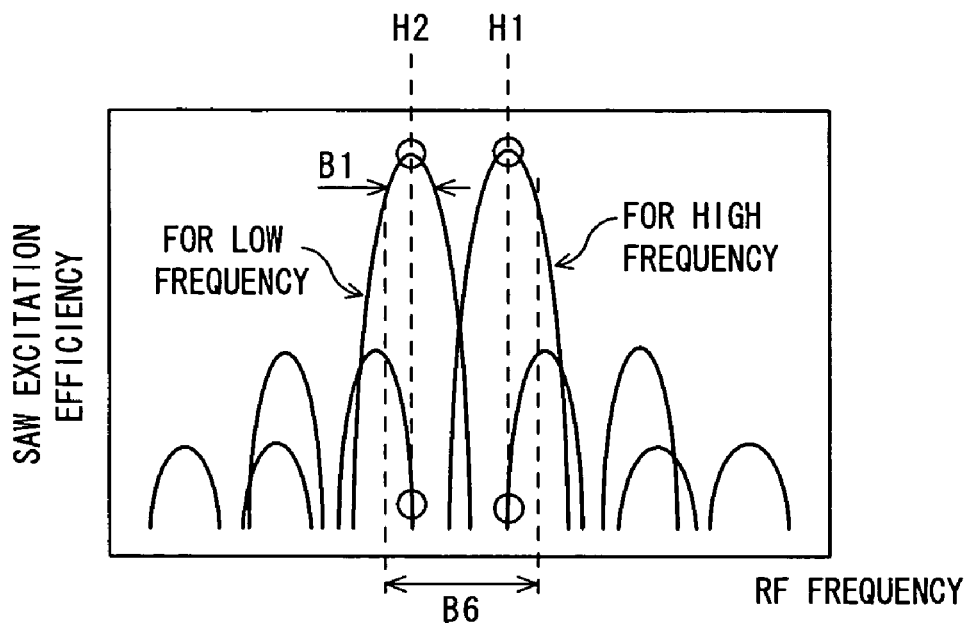
FIG. 7 depicts an operation and effect of the third variation of the first embodiment.

Furthermore, in this acousto-optic device 10A, the relation between distances (L1, L2) between teeth of the tooth electrodes 15c to 15f is to be adjusted according to RF signals to be supplied from the RF electric source 16 to the root electrode 15a in order that the SAW excitation efficiency characteristic with respect to the RF signal becomes as shown in FIG. 7.

That is, the distances between teeth of the tooth electrodes 15c to 15f are so adjusted that the SAW excitation efficiency of the first pair of comb electrodes 15A-1 becomes highest at point H1 shown in FIG. 7, while the SAW excitation efficiency of the second pair of electrodes 15A-2 at point H1 becomes nearly zero, that is, any SAW is not substantially excited. Likewise, the distances between teeth of the tooth electrodes 15c to 15f are so adjusted that the SAW excitation efficiency of the second pair of comb electrodes 15A-2 becomes highest at point H2 shown in FIG. 7, while the SAW excitation efficiency of the first pair of electrodes 15A-1 at point H2 becomes nearly zero, that is, any SAW is not substantially excited.

In other words, also in case that RF signals having the same frequency are applied to the pairs of comb electrodes 15A-1, 15A-2 through the root electrode 15a, RF frequency bands causing high excitation efficiencies are different from each other according to the distances between teeth of their respective tooth electrodes 15c to 15f, and thereby influences of the pairs of comb electrodes 15A-1, 15A-2 on each other can be negligible small, thereby making a state that an RF signal is applied to only the pair of comb electrodes 15A-1 or 15A-2 whose excitation efficiency becomes substantially high.

In this case, when the electric power which is possible to be supplied for SAW excitation by the RF electric source 16 is taken into consideration, the frequency band of RF signals is B1 (see FIG. 19) in the conventional art, while the band being able to be supplied as RF signals can be extended like band B6 shown in FIG. 7. That is, the frequency band of SAWs being able to be excited can also be extended corresponding to the extension of the band of RF signals.

Thus, the third variation of the first embodiment has an advantage similar to that of the first embodiment described above even if the first and second pairs of comb electrodes 15A-1, 15A-2 have a shared configuration.

Furthermore, the relation between distances (L1, L2) between teeth of the tooth electrodes 15c to 15f is adjusted according to RF signals to be supplied from the RF electric source 16 to the root electrode 15a, so that an RF signal from the RF electric source 16 is not necessary to be selectively output by a change-over switch 18, a bandpass filter/splitter 18A, or the like, and thereby device configuration can be simplified.

[A5] Fourth Variation of First Embodiment

In the first embodiment and variations described above, the transducer electrode unit 15 (15A) comprises of the pairs of comb electrodes 15-1, 15-2 (15A-1, 15A-2) provided on the upper reaches of the optical waveguides 13a-1, 13a-2. However, like an acousto-optic device 10B shown in FIG. 8 for example, four pairs of comb electrodes 15-1 to 15-4 having distances between teeth different from each other may be provided right and left on the upper reaches and lower reaches of the direction of light propagation of the parallel optical waveguides 13a-1, 13a-2.

Figure 8:
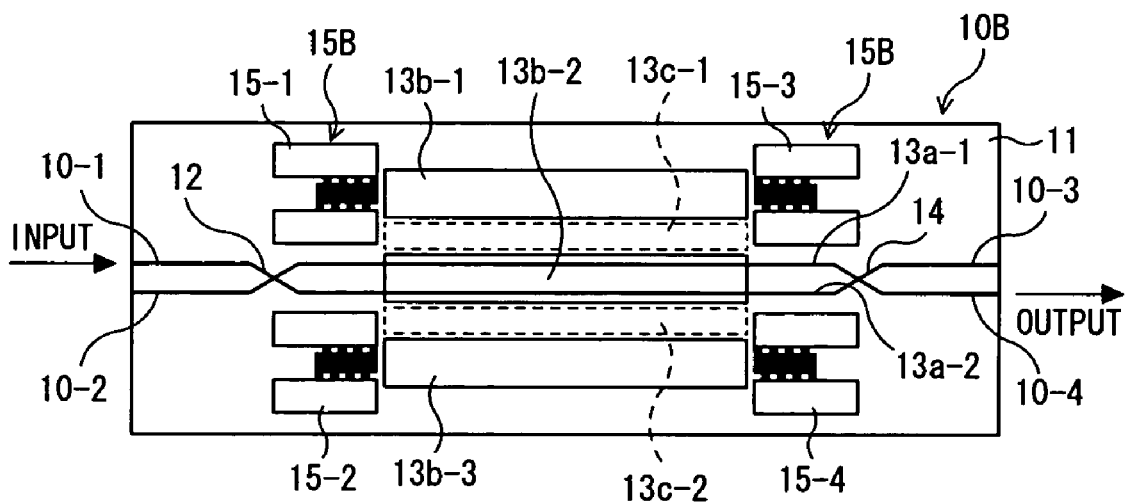
FIG. 8 shows an acousto-optic device according to the fourth variation of the first embodiment of the present invention.

As in the case of the first embodiment, an RF electric source 16, RF signal control unit 17, and change-over switch 18, which are not shown in FIG. 8, may be provided. In addition, configurations as shown in FIGS. 4 to 6 may be applied as variations. The same notations in FIG. 8 as ones in FIG. 1 represent similar portions.

Furthermore, the pairs of comb electrodes 15-1 to 15-4 are configured to have distances between teeth increased in the order of the pairs of comb electrodes 15-3, 15-1, 15-2, 15-4, for example, according to frequency bands of SAWs to be generated. That is, the RF signal control unit 17 not shown in FIG. 8 is able to control the frequency of an RF signal applied to the pair of comb electrode 15-3 to be highest, and to control other frequencies of RF signals applied to the pair of comb electrodes 15-1, 15-2, 15-4 to be decreased in this order.

In other words, RF signals may be supplied from the RF electric source 16 to the pairs of comb electrodes 15-1 to 15-4 defined every frequency band. In this case, frequencies of SAWs excited by the pairs of comb electrodes 15-3, 15-1, 15-2, 15-4 may be decreased in this order.

Furthermore, SAWs excited by the pairs of comb electrodes 15-1 to 15-4 are to directionally couple to the surface acoustic wave guide 13b-2 as in the case of the first embodiment. That is, SAWs excited by the pairs of comb electrodes 15-1, 15-2 are to directionally couple from the surface acoustic wave guides 13b-1, 13b-3 at the upstream sides of the optical waveguides 13a-1, 13a-2 to the surface acoustic wave guide 13b-2 through the regions 13c-1, 13c-2, respectively. Likewise, SAWs excited by the pairs of comb electrodes 15-3, 15-4 are to directionally couple from the surface acoustic wave guides 13b-1, 13b-3 at the downstream sides of the optical waveguides 13a-1, 13a-2 to the surface acoustic wave guide 13b-2 through the regions 13c-1, 13c-2, respectively.

Thus, the acousto-optic device 10B according to the fourth variation of the first embodiment has an advantage similar to that of the first embodiment described above, and has an advantage that frequency bands to be generated as SAWs can also be extended to wider bands because it comprises the four pairs of comb electrodes 15-1 to 15-4 having distances between teeth different from each other provided right and left on the upper reaches and lower reaches of the direction of light propagation of the parallel optical waveguides 13a-1, 13a-2.

[A6] Fifth Variation of First Embodiment

In the first embodiment and variations described above, a transducer electrode unit 15 (15A, 15B) is compriseed by the pairs of comb electrodes allowing SAWs excited to directionally couple to the surface acoustic wave guide 13b-2. However, like an acousto-optic device 10C shown in FIG. 9 for example, a transducer electrode unit 15C may be comprised by the pairs of comb electrodes 15C-1, 15C-2 having distances between teeth different from each other provided on the upper reaches and lower reaches of the parallel optical waveguides 13a-1, 13a-2.

Figure 9:
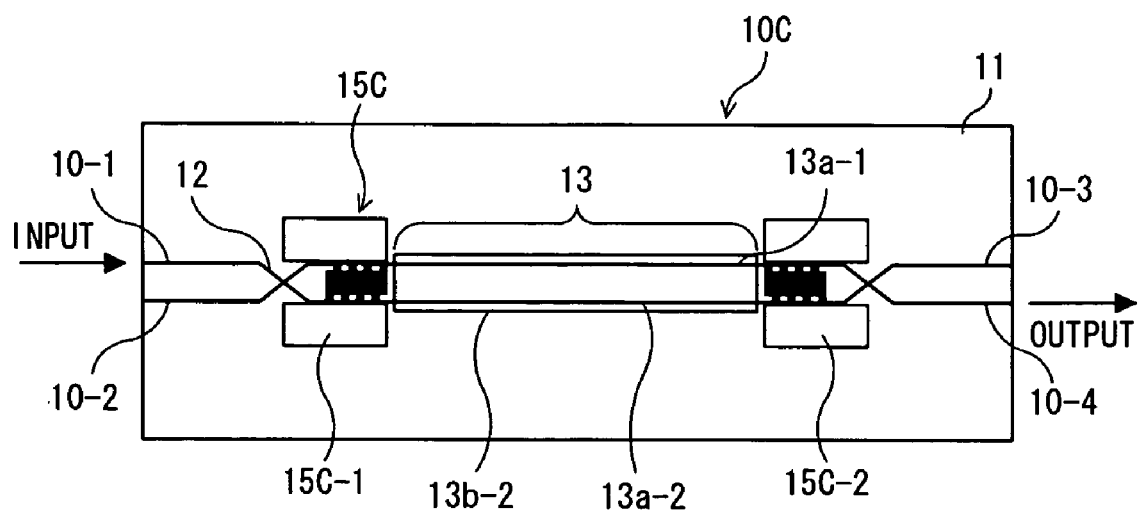
FIG. 9 shows an acousto-optic device according to the fifth variation of the first embodiment of the present invention.

In the acousto-optic device 10C shown in FIG. 9, the pair of comb electrodes 15C-1 provided on the upper reaches of the optical waveguides 13a-1, 13a-2 has a relatively short distance L1 between teeth [see FIG. 2(A)], and the pair of electrodes 15C-2 provided on the lower reaches of the optical waveguides 13a-1, 13a-2 has a relatively long distance L2 between teeth [see FIG. 2(B)], so that the pairs of comb electrodes 15C-1, 15C-2 to which an RF signal is supplied can be discriminated according to the frequency band of the RF signal.

As in the case of the first embodiment, an RF electric source 16, RF signal control unit 17, and change-over switch 18, which are not shown in FIG. 9, may be provided as the configuration for supplying RF singnal. In addition, configurations as shown in FIGS. 4 and 5 may be applied as variations. The same notations in FIG. 9 as ones in FIG. 1 represent similar portions.

In the acousto-optic device 10C configured like this, the pairs of comb electrodes 15C-1, 15C-2 comprising the transducer electrode unit 15C are supplied with RF signals defined every frequency band from an RF electric source not shown in the figure. Thus, a SAW having a relatively high frequency is excited by the pair of comb electrodes 15C-1, and a SAW having a relatively low frequency is excited by the pair of comb electrodes 15C-2.

A SAW excited by the pair of comb electrodes 15C-1 or 15C-2 is kept and propagates in the surface acoustic wave guide 13b-2, so that by the interaction of the SAW with light propagating in the parallel optical waveguides 13a-1, 13a-2, mode conversion of light having an optical wavelength corresponding to the frequency of the SAW is performed. Thus, the surface acoustic wave guide 13b-2 and the parallel optical waveguides 13a-1, 13a-2 comprise an interaction region 13.

Thus, the acousto-optic device 10C according to the fifth variation of the first embodiment also comprises the pairs of comb electrodes 15C-1, 15C-2 having distances between teeth different from each other, which are pairs of comb electrodes configured so as to correspond to a frequency band to be generated as a SAW, so that the frequency band of RF signals being able to be supplied for SAW excitation can be extended as in the case of the first embodiment described above, which provides an advantage that the frequency band being able to be generated as a SAW can also be extended.

In FIG. 9 described above, the transducer electrode unit 15C comprises of the pairs of comb electrodes 15C-1, 15C-2 which are provided on the upper reaches and lower reaches of the parallel optical waveguides 13a-1, 13a-2 and are capable of generating SAWs of zero order mode having different frequencies being able to be excited. However, this invention is not limited to this, and the transducer electrode unit 15C may comprise of two pairs of comb electrodes provided on the upper reaches of the parallel optical waveguides 13a-1, 13a-2, the two pairs of comb electrodes having different distances between teeth. Likewise, the transducer electrode unit 15C may comprise of two pairs of comb electrodes provided on the lower reaches of the parallel optical waveguides 13a-1, 13a-2, the two pairs of comb electrodes having different distances between teeth. Other arrangements of pairs of comb electrodes are possible without departing from the spirit and scope of the present invention.

[A7] Sixth Variation of First Embodiment

In the fifth variation of the first embodiment described above, the transducer electrode unit 15C comprises of the pairs of comb electrodes 15C-1, 15C-2 which are provided on the upper reaches and lower reaches of the parallel optical waveguides 13a-1, 13a-2 and are capable of generating SAWs of zero order mode having different frequencies being able to be excited. However, as a variation, like the acousto-optic device 10D shown in FIG. 10 for example, a transducer electrode unit 15D may be provided compriseing of a pair of comb electrodes 15C-1 provided on the upper reaches and a pair of comb electrodes 15D-2 capable of generating a SAW of higher order mode provided on the lower reaches.

Figure 10:
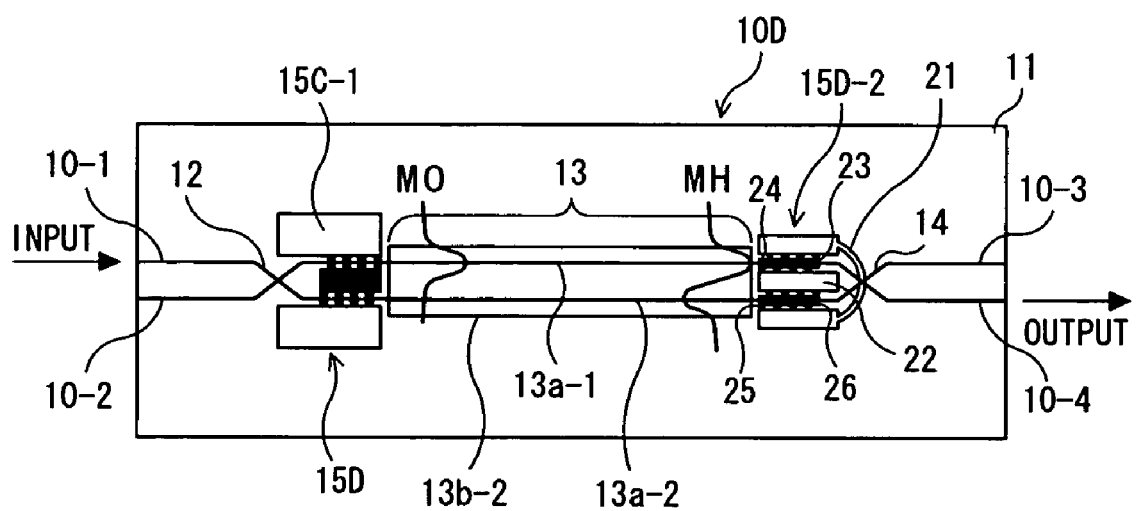
FIG. 10 shows an acousto-optic device according to the sixth variation of the first embodiment of the present invention.

That is, in the acousto-optic device 10D shown in FIG. 10, the transducer electrode unit 15D comprises of the pair of comb electrodes 15C-1 capable of generating a SAW having an intensity distribution of zero order mode as in the case of the fifth variation (see FIG. 9) of the first embodiment described above, and the pair of comb electrodes 15D-2 capable of generating a SAW of higher order mode MH provided at the location of the pair of comb electrodes 15C-2.

Also in the transducer electrode unit 15D shown in FIG. 10, the pair of comb electrodes 15C-1 has a relatively short distance L1 between teeth [see FIG. 2(A)], and the pair of electrodes 15D-2 provided on the lower reaches has a relatively long distance L2 between teeth [see FIG. 2(B)], so that the pairs of comb electrodes 15C-1, 15D-2 to which an RF signal is supplied can be discriminated according to the frequency band of the RF signal. In other words, the pair of comb electrodes 15D-2 having an intensity distribution of higher mode MH is allowed to excite a SAW having a lower frequency than a SAW excited by the pair of comb electrodes 15C-1, and thereby the frequency band of SAWs can be extended.

Figure 11:
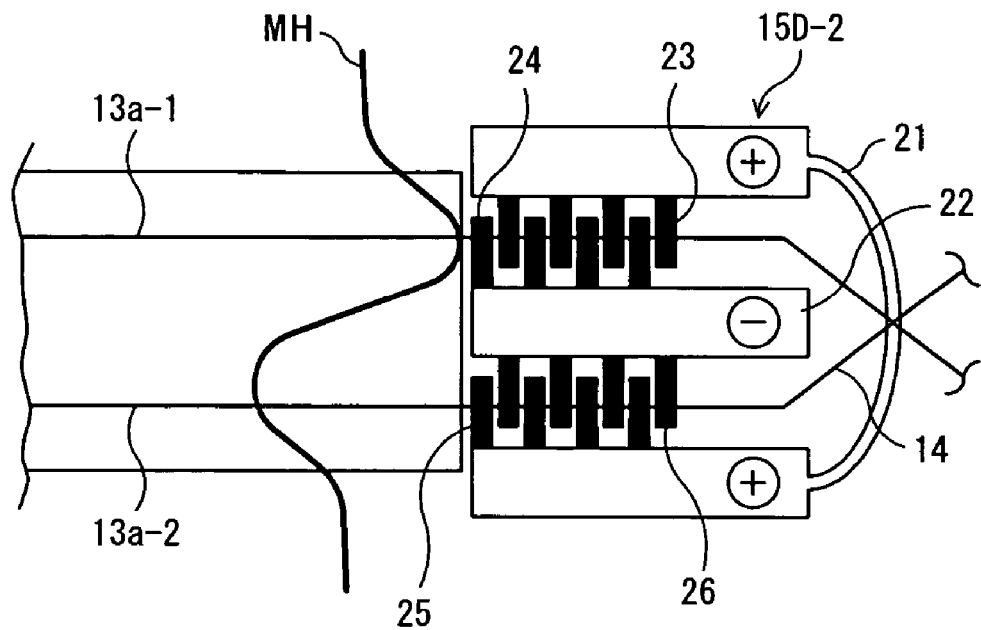
FIG. 11 shows the main part of an acousto-optic device according to the sixth variation of the first embodiment.

The pair of comb electrodes 15D-2 comprises, as shown in FIG. 11, a root electrode 21 which is so formed in one piece that the right portion and left portion of it located at the right and left sides of the light propagation direction of the parallel optical waveguides 13a-1, 13a-2 communicate with each other, a root electrode 22 which is formed in the position between the optical waveduides 13a-1 and 13a-2, and tooth electrodes 23 to 26.

That is, the tooth electrode 23 is formed with the root electrode 21 in one piece so as to be orthogonal to the optical waveguide 13a-1, and has a relatively long distance between teeth [see L2 shown in FIG. 2(B)]. Further, the tooth electrode 24 is formed with the root electrode 22 in one piece so as to interdigitate with the tooth electrode 23, and has the same distance L1 between teeth as the tooth electrode 23. Further, the tooth electrode 25 is formed with the root electrode 21 in one piece so as to be orthogonal to the optical waveguide 13a-2, and has a relatively long distance between teeth [see L2 shown in FIG. 2(B)]. Further, the tooth electrode 26 is formed with the root electrode 22 in one piece so as to interdigitate with the tooth electrode 25, and has the same distance L2 between teeth as the tooth electrode 25.

In addition, the formation pattern of the tooth electrodes 23, 24 orthogonal to the optical waveguide 13a-1 is opposite to the formation pattern of the tooth electrodes 25, 26 orthogonal to the optical waveguide 13a-2, so that the phase of a surface acoustic wave generated by the root electrodes 21, 22 and tooth electrodes 23, 24 is opposite to the phase of a surface acoustic wave generated by the root electrodes 21, 22 and tooth electrodes 25, 26. Thus, a SAW excited by the pair of electrodes 15D-2 may have an intensity distribution of higher order mode MH as shown in FIGS. 10 and 11.

As in the case of the first embodiment, an RF electric source 16, RF signal control unit 17, and change-over switch 18, which are not shown in FIG. 10, may be provided as the configuration for supplying RF singnal. In addition, configurations as shown in FIGS. 4 and 5 may be applied as variations. The same notations in FIG. 10 as ones in FIG. 1 represent similar portions.

In the acousto-optic device 10D configured like this, the pairs of comb electrodes 15C-1, 15D-2 comprising the transducer electrode unit 15D are supplied with RF signals defined every frequency band from an RF electric source not shown in the figure. Thus, a SAW having a relatively low frequency and an intensity distribution of zero order mode is excited by the pair of comb electrodes 15C-1, and a SAW having a relatively high frequency and an intensity distribution of higher order mode is excited by the pair of comb electrodes 15D-2.

Thus, the acousto-optic device 10D according to the sixth variation of the first embodiment also comprises the pairs of comb electrodes 15C-1, 15D-2 having distances between teeth different from each other, which are pairs of comb electrodes configured so as to correspond to a frequency band to be generated as a SAW, so that the frequency band of RF signals being able to be supplied for SAW excitation can be extended as in the case of the first embodiment described above, which provides an advantage that the frequency band being able to be generated as a SAW can also be extended.

In the acousto-optic device 10D shown in FIG. 10 described above, in order to generate a SAW having an intensity distribution of higher order mode by the pairs of comb electrodes 15D-2, the formation pattern of the tooth electrodes 23, 24 orthogonal to the optical waveguide 13a-1 is opposed to the formation pattern of the tooth electrodes 25, 26 orthogonal to the optical waveguide 13a-2. However, a SAW having an intensity distribution of higher order mode may be generated by any other technique.

For example, the pair of comb electrode on the optical waveguide 13a-1 and the pair of comb electrode on the optical waveguide 13a-2 are separated from each other, while the teeth patterns of the pairs of comb electrode are formed as the same pattern, and a phase shifter or the like may be used to allow RF signals applied to the pairs of comb electrodes to have opposite phases.

[B1] Second Embodiment

Figure 12:
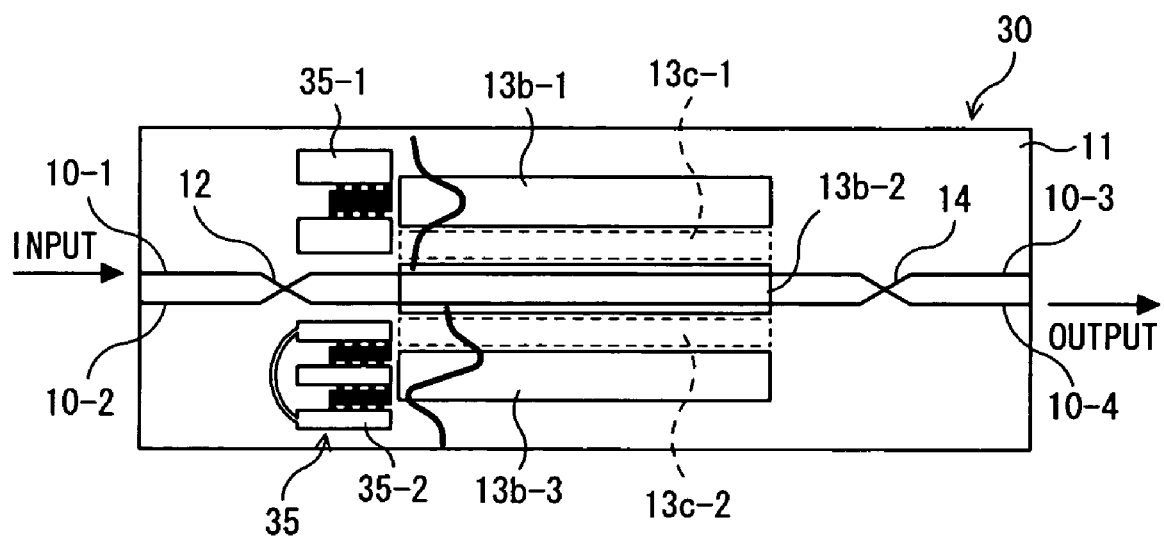
FIG. 12 shows an acousto-optic device according to the second embodiment of the present invention.

FIG. 12 shows an acousto-optic device according to the second embodiment of the present invention. The acousto-optic device 30 shown in FIG. 12 comprises a transducer electrode unit 35 different from that of the acousto-optic device 10 (see FIG. 1) in the first embodiment described above. Other components than the transducer electrode unit 35 are basically similar to ones of the first embodiment described above. The same notations in FIG. 12 as ones in FIG. 1 represent substantially similar portions.

As in the case of the first embodiment, an RF electric source 16, RF signal control unit 17, and change-over switch 18, which are not shown in FIG. 12, may be provided as the configuration for supplying RF singnal. In addition, configurations as shown in FIGS. 4 and 5 may be applied as variations. The same notations in FIG. 12 as ones in FIG. 1 represent similar portions.

In the acousto-optic device shown in FIG. 12, the transducer electrode unit 35 is provided with pairs of comb electrodes 35-1, 35-2 having teeth patterns corresponding to frequency bands to be generated as SAWs propagating in the surface acoustic wave guides 13b-1 to 13b-3 and the regions 13c-1, 13c-2. Specifically, the pairs of comb electrodes 35-1, 35-2 are so configured that SAWs generated directionaly couple for the parallel optical waveguides 13a-1, 13a-2, and are configured so as to have teeth patterns capable of generating surface acoustic waves of different kind of mode orders from each other, corresponding to frequency bands to be generated as SAWs.

That is, the pair of electrodes 35-1 is assigned a relatively low frequency band as the frequency of a SAW excited to be able to excite a SAW having an intensity distribution of zero order mode. Further, the pair of electrodes 35-2 is assigned a relatively high frequency band as the frequency of a SAW excited to be able to excite a SAW having an intensity distribution of higher order mode.

Figure 13:
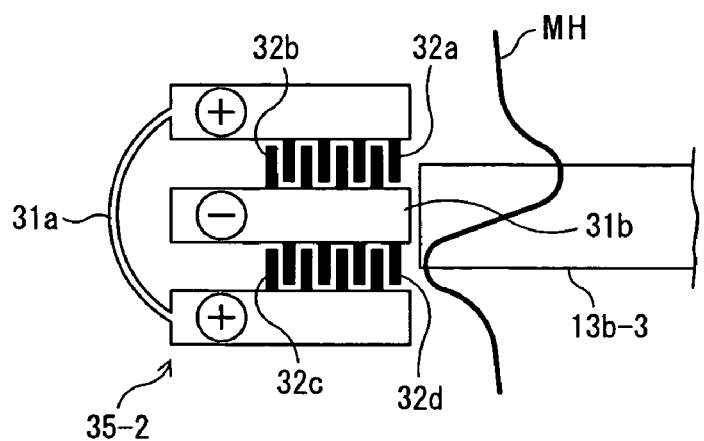
FIG. 13 shows the main part of an acousto-optic device according to the second embodiment.

The pair of comb electrodes 35-2 may be configured like the pair of comb electrodes 15D-2 shown in FIG. 11 described above. That is, as shown in FIG. 13 for example, the pair of comb electrodes 35-2 comprises root electrodes 31a, 31b and tooth electrodes 32a to 32d, and is so formed that the interdigitation pattern of the tooth electrodes 32a, 32b is opposite to that of the tooth electrodes 32c, 32d. Thus, a SAW excited by the pair of electrodes 35-2 may also have an intensity distribution of higher order mode MH as shown in FIG. 12.

Figure 14:
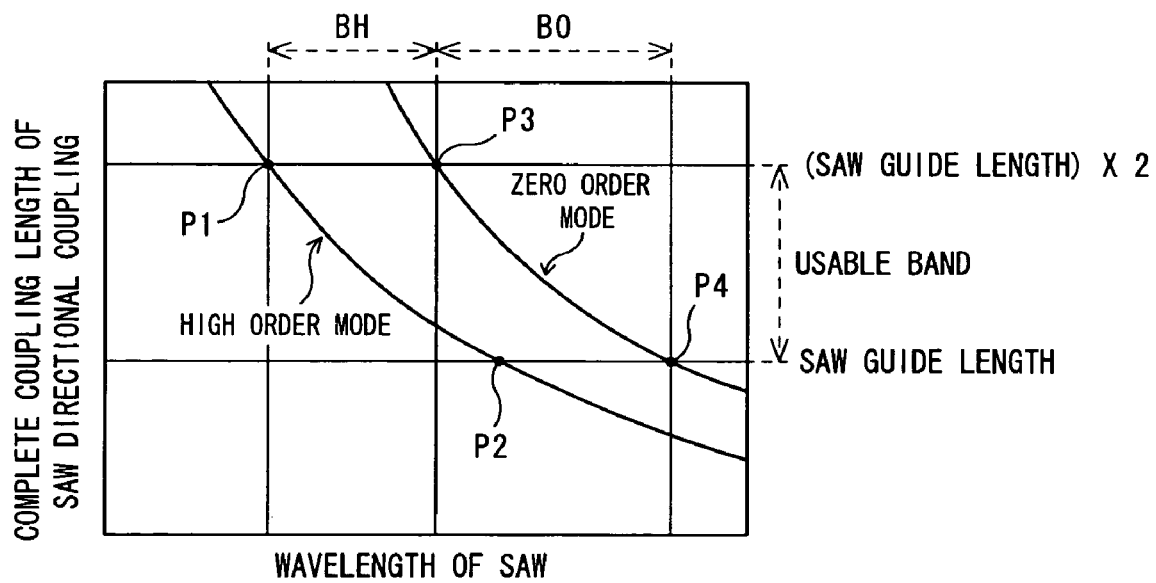
FIG. 14 depicts an operation and effect of the second embodiment.

FIG. 14 shows a distribution of directional coupling lengths corresponding to SAW wavelengths in an acousto-optic device having directional coupling type surface acoustic wave guides 13b-1 to 13b-3 as shown in FIG. 12. As shown in FIG. 13, there is a limit on the range of SAW wavelengths coupling to the surface acoustic wave guide 13b-2, while the wavelength band (frequency band) coupling to the surface acoustic wave guide 13b-2 varies according to the mode order of a SAW which is propagated.

That is, when a SAW of higher order mode excited by the pair of comb electrodes 35-2 has a wavelength of a SAW corresponding to point P1 in FIG. 14, the complete coupling length for the SAW is two times as long as the length of the surface acoustic wave guide 13b-1, and the SAW couples to the surface acoustic wave guide 13b-2 at its downstream end. Further, when the wavelength of a SAW corresponds to point P2 in FIG. 14, the complete coupling length for the SAW is equivalent to the length of the surface acoustic wave guide 13b-1, and the SAW couples to the surface acoustic wave guide 13b-2 at its intermediate portion in the longitudinal direction.

Furthermore, when a SAW of zero order mode excited by the pair of comb electrodes 35-1 has a wavelength corresponding to point P3 in FIG. 14, the complete coupling length of the SAW is two times as long as the length of the surface acoustic wave guide 13b-1, and the SAW couples to the surface acoustic wave guide 13b-2 at its downstream end. Further, when the wavelength of a SAW corresponds to point P4 in FIG. 14, the complete coupling length of the SAW is equivalent to the length of the surface acoustic wave guide 13b-1, and the SAW couples to the surface acoustic wave guide 13b-2 at its intermediate portion in the longitudinal direction.

In order to allow a SAW excited by the pair of comb electrodes 35-1 or 35-2 to make mode conversion of light propagating in the optical waveguide 13a-1 or 13a-2, it is necessary for the SAW excited to couple to at least the surface acoustic wave guide 13b-2 formed on the optical waveguides 13a-1, 13a-2. Thus, as SAWs excited by the pair of comb electrodes 35-1, the band B0 corresponding to wavelengths P3 to P4 may be used for mode conversion of light. As SAWs excited by the pair of comb electrodes 35-2, the band BH which is a band corresponding to wavelengths P1 to P2 except the overlap between the band corresponding to wavelengths P1 to P2 and the band B0 may be used for mode conversion of light.

In the above case, in the overlapping band between the band corresponding to wavelengths P1 to P2 and the band B0, SAWs of zero order mode excited by the pairs of comb electrodes 35-1 are used. However, in this overlapping band, SAWs of zero order mode and SAWs of higher order mode both couple to the surface acoustic wave guide 13b-2, and therefore SAWs of higher order mode excited by the pair of comb electrodes 35-2 may be used.

Furthermore, distances between teeth of the pairs of comb electrodes 35-1, 35-2 can be set according to wavelength bands (i.e., frequency bands) of SAWs to be excited as in the case of the first embodiment described above. In this case, the distance between teeth of the pair of comb electrodes 35-1 may be longer than the distance between teeth of the pair of electrodes 35-2.

In the acousto-optic device 30 according to the second embodiment configured as described above, on the ground that SAW wavelengths coupling to the surface acoustic wave guide 13b-2 vary with mode orders excited, when exciting a SAW having a relatively low frequency (i.e., relatively long wavelength), an RF signal is applied to the pair of comb electrodes exciting a SAW of zero order mode, and when exciting a SAW having a relatively high frequency (i.e., relatively short wavelength), an RF signal is applied to the pair of electrodes exciting a SAW of higher order mode.

The pair of comb electrodes 35-1 to which an RF signal has been applied is able to excite a SAW having a relatively low frequency (see the range of wavelength band B0 in FIG. 14), while the pair of comb electrodes 35-2 is able to excite a SAW having a relatively high frequency (see the range of wavelength band BH in FIG. 14).

Thus, the SAW frequency band which is extended within the range of band B0 in the case shown in FIG. 1 described above can be extended to the range of band BH+B0. By using SAWs whose frequency band is extended like this, the range of optical wavelengths to which mode conversion is possible can also be further extended.

As described above, in the acousto-optic device 30 according to the second embodiment of the present invention, the pairs of comb electrodes 35-1, 35-2 comprising the transducer electrode unit 35 are configured so as to be able to generate surface acoustic waves having different kind of mode orders from each other, corresponding to frequency bands to be generated as surface acoustic waves propagating in the surface acoustic wave guides 13b-1 to 13b-3, which provides an advantage that the frequency band of SAWs being able to be excited can be extended to the (high frequency) range to which the frequency band has not conventionally been able to extended.

In the second embodiment described above, distances between teeth of the pairs of comb electrodes 35-1, 35-2 are set according to SAW wavelengths excited. However, when bands of SAW wavelengths generated by the pairs of comb electrodes are assigned, any other technique than this may be used, which also provides an advantage that the frequency band of SAWs can also be extended to the range to which the frequency band of SAWs of zero order mode has not conventionally been able to be extended.

[B2] Variation of Second Embodiment

Figure 15:
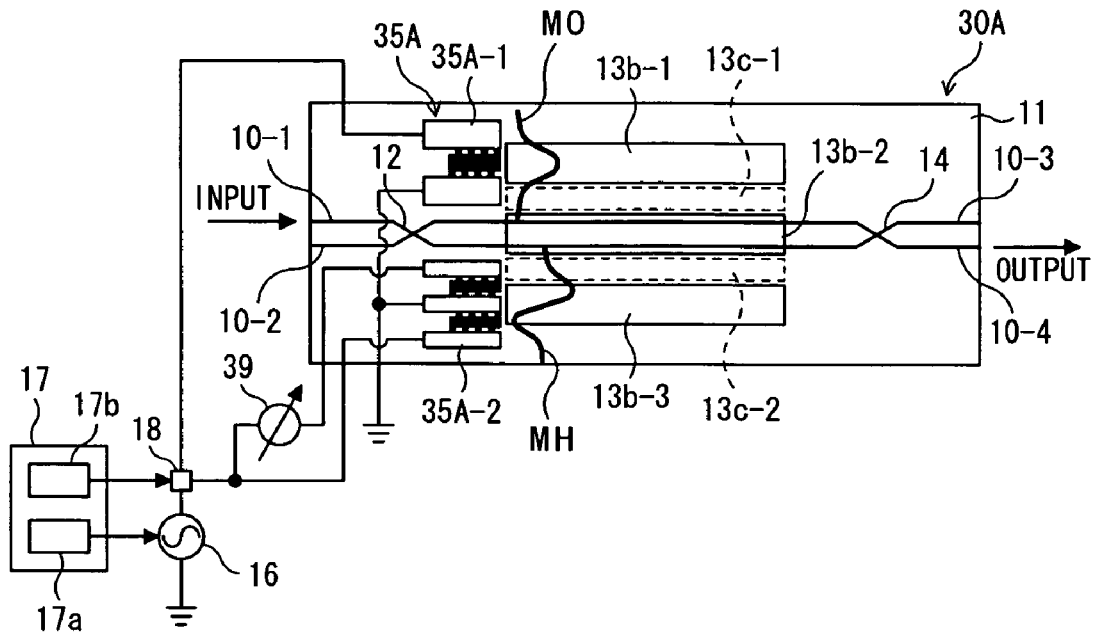
FIG. 15 shows an acousto-optic device according to a variation of the second embodiment of the present invention.
Figure 16:
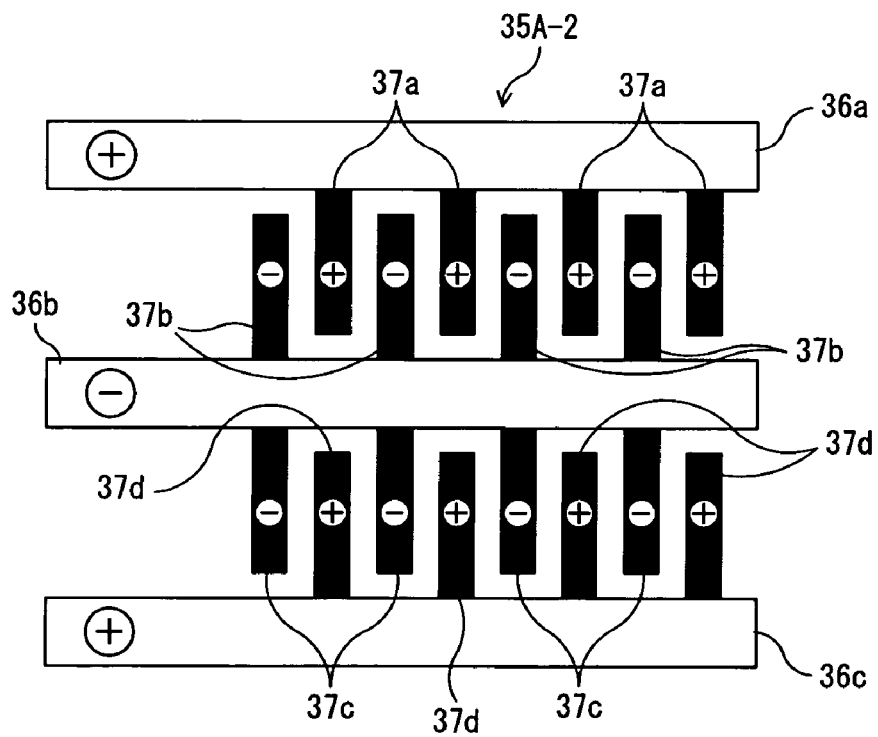
FIG. 16 shows the main part of an acousto-optic device according to a variation of the second embodiment.

FIG. 15 shows an acousto-optic device 30A according to a variation of the second embodiment of the present invention, and FIG. 16 shows a pair of comb electrodes 35A-2 which is the main part of the acousto-optic device 30A. The acousto-optic device 30A shown in FIG. 15 is different from the acousto-optic device 30 according to the second embodiment described above in the configuration of the transducer electrode unit 35A and in the method of supplying an RF signal to the transducer electrode unit 35A.

That is, in the second embodiment described above, the transducer electrode unit 35 comprises the pair of comb electrodes 35-2 which is so formed that the interdigitation pattern of the tooth electrodes 32a, 32b is opposite to that of the tooth electrodes 32c, 32d in order to excite a SAW of higher order mode. However, as a variation, the pair of comb electrodes 35A-2 may be configured as shown in FIGS. 15 and 16 for example.

In the pair of comb electrodes 35A-2, a root electrode 36a and a tooth electrode 37a are formed in one piece as shown in FIG. 16, a root electrode 36b and a tooth electrode 37b and 37c are formed in one piece, and a root electrode 36c and a tooth electrode 37d are formed in one piece. The interdigitation pattern of the tooth electrodes 37a, 37b and the interdigitation pattern of the tooth electrodes 37c, 37d are formed so as to have the same phase.

An RF signal from the RF electric source 16 is input to the root electrodes 36a, 36c through the change-over switch 18, and in particular the phase of an RF signal input to the root electrode 36a is converted by the phase shifter 39 to be opposite to the phase of an RF signal input to the root electrode 36c. Thus, a SAW excited by the pair of electrodes 35A-2 may have an intensity distribution of higher order mode as shown in FIGS. 15 and 16.

Distances between teeth of the pairs of comb electrodes 35A-1, 35A-2 can be set according to wavelength bands (i.e., frequency bands) of SAWs to be excited as in the case of the second embodiment described above. In this case, the distance between teeth of the pair of comb electrodes 35A-1 may be longer than the distance between teeth of the pair of electrodes 35A-2.

Thus, the acousto-optic device 30A according to a variation of the second embodiment of the present invention comprise the directional coupling type surface acoustic wave guides 13b-1 to 13b-3, the pair of comb electrodes 35A-1 capable of exciting a SAW of zero order mode, and the pair of comb electrodes 35A-2 capable of exciting a SAW of higher order mode, which provides an advantage that the frequency band of SAWs being able to be excited can be extended to the (high frequency) range to which the frequency band has not conventionally been able to be extended.

[C] Others

In spite of the above embodiments, various variations of them may be implemented without departing from the sprit and scope of the present invention.

Figure 22:
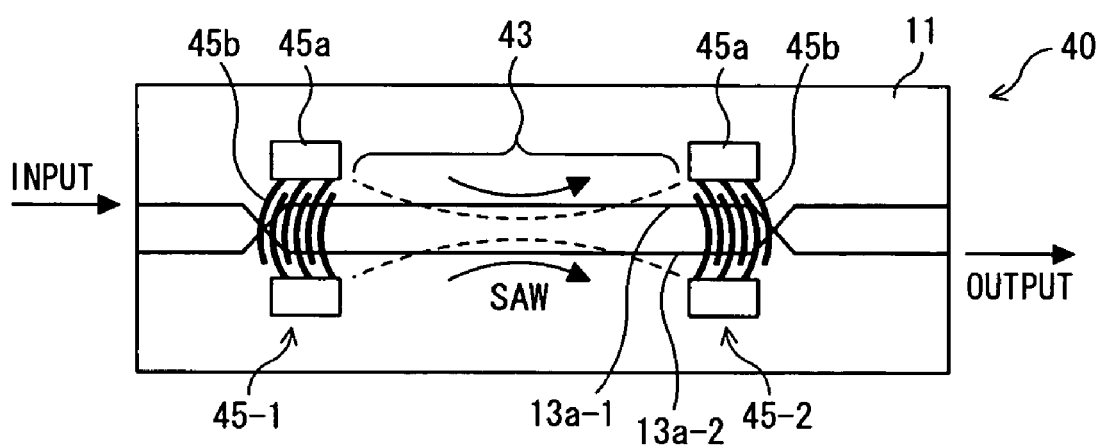
FIG. 22 shows an acousto-optic device according to another embodiment of the present invention.

For example, an acousto-optic device 40 configured as shown in FIG. 22 may be used.

The acousto-optic device 40 as shown in FIG. 22 comprises pairs of curved comb electrodes 45-1, 45-2, as compared with the acousto-optic device 10C shown in FIG. 9 described above, instead of the pairs of comb electrodes 15C-1, 15C-2 provided on the upper reaches and lower reaches of the optical waveguides 13a-1, 13a-2, without forming the surface acoustic wave guide 13b-2. Each of the pairs of curved comb electrodes 45-1, 45-2 comprises of root electrodes 45a and curved tooth electrodes 45b.

Each of the curved tooth electrodes 45b of the pairs of curved comb electrodes 45-1, 45-2 is formed so as to be curved like an arc, and the curved portions 45b of the pairs of curved comb electrodes 45-1, 45-2 are directed in such a manner that the insides of the arcs face each other. Thus, the region 43 between the pairs of curved comb electrodes 45-1, 45-2 comprises an interaction region causing an interaction between light and a SAW. This interaction region 43 is comprised as a surface acoustic wave propagation unit capable of propagating a surface acoustic wave causing an interaction with light propagating in the optical waveguide 13a-1.

In the acousto-optic device 40 configured like this, SAWs excited by the pairs of curved comb electrodes 45-1, 45-2 propagate in the interaction region 43. Since there is no surface acoustic wave guide 13b-2 as shown in FIG. 1 in the interaction region 43, SAWs excited are focused onto the optical waveguides 13a-1, 13a-2, and cause interactions with light propagating in the optical waveguides 13a-1, 13a-2.

Distances (distances between teeth) of the curved tooth electrodes 45b of the pairs of curved comb electrodes 45-1, 45-2 are different from each other, so that the frequency band of RF signals being able to be supplied for SAW excitation can be extended, which provides an advantage that the frequency band being able to be generated as a SAW can also be extended.

The pairs of curved comb electrodes may be used for the IDTs of the embodiments described above as appropriate in addition to the IDT shown in FIG. 9 described above.

In the above embodiments, the surface acoustic wave guides 13b-1 to 13b-3 are formed as a surface acoustic wave propagation unit to propagate surface acoustic waves, while a substrate region which keeps and propagate a SAW in a region divided with a partition may be provided as a surface acoustic wave propagation unit. A technique of propagating a surface acoustic wave in a region divided with a partition is disclosed in U.S. Pat. No. 5,218,653 for example.

It is possible to manufacture a device of the present invention according to any of the above embodiments.

What is claimed is:

1. An acousto-optic device that performs mode conversion of light at a wavelength determined by a surface acoustic wave propagating in the acousto-optic device, comprising:
   a light propagation part propagating light;
   a transducer electrode part provided with a plurality of transducer electrodes adapted to generate a plurality of surface acoustic waves in a plurality of ranges of wavelengths different and separate from each other, respectively, which combine to form a resulting surface acoustic wave; and
   a surface acoustic wave propagation part which propagates the resulting surfacea coustic wave causing interaction with the light propagating in the light propagation part, and thereby causing the acoustic-optic device to perform mode conversion of light propagating in the light propagation part at a wavelength determined by the resulting surface acoustic wave, wherein the combined surface acoustic wave provides a range of wavelengths at which the acousto-optic device is capable of performing mode conversion that is greater than a range provided by any of said plurality of surface acoustic waves taken individually.

2. An acousto-optic device according to claim 1, wherein said each of said plurality of transducer electrodes comprises pairs of comb electrodes, and each of said pairs of comb electrodes is configured so as to have a distance between teeth different from each other, corresponding to a frequency range for the respective surface acoustic wave generated by the respective transducer electrode that comprises the respective pair.

3. An acousto-optic device according to claim 2, wherein the pairs of comb electrodes are provided separately on upper reaches and lower reaches of said light propagation part with respect to a propagation direction of the light.

4. An acousto-optic device according to claim 2, wherein two of the pairs of comb electrodes are provided right and left on upper reaches of said light propagation part with respect to a propagation direction of the light.

5. An acousto-optic device according to claim 2, wherein two of the pairs of comb electrodes are provided right and left on lower reaches of said light propagation part with respect to a propagation direction of the light.

6. An acousto-optic device according to claim 2, wherein at least two of said pairs of comb electrodes have a shared structure.

7. An acousto-optic device according to claim 1, wherein:
said surface acoustic wave propagation part is provided with a surface acoustic wave guide which is so configured that said resulting surface acoustic wave makes a directional coupling to said light propagation part; and
each of said plurality of transducer electrodes is configured to provide a corresponding frequency range for the respective surface acoustic wave generated by the respective electrode, so as to be able to generate the respective surface acoustic wave having a different kind of mode order from the surface acoustic waves generated by the other transducer electrodes.

8. An acousto-optic device according to claim 7, wherein each of said plurality of transducer electrodes include at least two pairs of comb electrodes in which comb electrode patterns are so formed that surface acoustic waves to be generated have opposite phases.

9. An acousto-optic device according to claim 7, further comprising a phase shifter making an electric signal applied to a first transducer electrode of said plurality of transducer electrodes from an electric signal source and an electric signal applied to a second transducer electrode of said plurality of transducer electrodes from said electric signal source to have opposite phases.

10. An acousto-optic device according to claim 1, wherein:
said transducer electrode part comprises a first transducer electrode comprising a pair of comb electrodes to which an electric signal of a first frequency band is applied to be able to generate a surface acoustic wave in a second frequency range, and a second transducer electrode comprising a pair of comb electrodes to which an electric signal of a third frequency band different from said first frequency band is applied to be able to generate a surface acoustic wave in a fourth frequency range different from said second frequency range; and
said acousto-optic device further comprises an electric signal source capable of generating an electric signal to be applied to said transducer electrode part, and a control unit controlling the supply of an electric signal generated by said electric signal source to either said first transducer electrode or said second transducer electrode, corresponding to the frequency range to be generated as said resulting surface acoustic wave.

11. An acousto-optic device according to claim 10, wherein:
said control unit comprises a frequency setting control unit controlling said electric signal source to set the frequency of an electric signal to be supplied to said transducer electrode unit, and a switching control unit outputting a switching control signal in order to output an electric signal having said frequency set by said frequency setting control unit to either said first transducer electrode or said second transducer electrode; and
said acousto-optic device further comprises a change-over switch selectively outputting an electric signal from said electric signal source to either said first transducer electrode or said second transducer electrode on the basis of said switching control signal from said switching control unit.

12. An acousto-optic device according to claim 10, wherein:
said control unit comprises a frequency setting control unit controlling said electric signal source to set the frequency of an electric signal to be supplied to said transducer electrode unit; and
said acousto-optic device further comprises a selectively outputting unit selectively outputting an electric signal from said electric signal source to either said first transducer electrode or said second transducer electrode according to the frequency of the electric signal.

13. An acousto-optic device according to claim 10, wherein:
said electric signal source comprises a first electric signal source capable of generating a first electric signal having said first frequency band to be supplied to said first transduce relectrode, and a second electric signal source capable of generating a second electric signal having said third frequency band to be supplied to said second transducer electrode; and
said control unit comprises an electric signal source switching control unit controlling said first electric signal source or said second electric signal source so that an electric signal is generated to either said first transducer electrode or said second transducer electrode.

14. An acousto-optic device according to claim 1, wherein said light propagation unit, said surface acoustic wave propagation unit, and said transducer electrode unit are provided on a substrate having a birefringence and an acousto-optic effect.

15. An acousto-optic device according to claim 1, wherein the acousto-optic device is an acousto-optic tunable filter (AOTF).

16. An acousto-optic device according to claim 1, wherein the light propagation part comprises:
a first polarization beam splitter splitting input light into first and second polarized waves;
first and second optical waveguides propagating the first and second polarized waves, respectively; and
a second polarization beam splitter combining the first and second polarized waves after propagating through the first and second optical waveguides, respectively, and splitting the combined waves into first and second polarized lights which are output from the second polarization beam splitter in first and second different output directions, respectively.

17. An acousto-optic device that performs mode conversion of light at a wavelength determined by a generated surface acoustic wave (SAW) propagating in the acousto-optic device, comprising:
   a first pair of comb electrodes capable of generating a first surface acoustic wave (SAW) having a corresponding frequency band; and
   a second pair of comb electrodes capable of generating a second SAW having a corresponding frequency band different and separate from the frequency band corresponding to the first SAW, wherein
   the first pair is individually selectable to generate the first SAW so that the first SAW propagates in the acousto-optic device and the acousto-optic device thereby performs mode conversion of light at a wavelength determined by the first SAW,
   the second pair is individually selectable to generate the second SAW so that the second SAW propagates in the acousto-optic device and the acousto-optic device thereby performs mode conversion of light at a wavelength determined by the second SAW,
   the first and second pairs are selectable together to generate a resulting SAW which is a combination of the first and second SAWs so that the resulting SAW propagates in the acousto-optic device and the acousto-optic device thereby performs mode conversion of light at a wavelength determined by the resulting SAW, and
   the resulting SAW has an extended frequency band greater than the frequency band corresponding to the first SAW and greater than the frequency band corresponding to the second SAW.

18. An acousto-optic device according to claim 17, wherein the acousto-optic device is an acousto-optic tunable filter (AOTF).

19. An acousto-optic device that performs mode conversion of light at a wavelength determined by a generated surface acoustic wave (SAW) propagating in the acousto-optic device, comprising:
   a first pair of comb electrodes capable of generating a first surface acoustic wave (SAW) having a corresponding frequency band;
   a second pair of comb electrodes capable of generating a second SAW having a corresponding frequency band which is different and separate than the frequency band corresponding to the first SAW; and
   means for individually selecting the first pair to generate the first SAW so that the first SAW propagates in the acousto-optic device and the acousto-optic device thereby performs mode conversion of light at a wavelength determined by the first SAW, for individually selecting the second pair to generate the second SAW so that the second SAW propagates in the acousto-optic device and the acousto-optic device thereby performs mode conversion of light at a wavelength determined by the second SAW, and for selecting the first and second pairs together to generate a resulting SAW which is a combination of the first and second SAWs so that the resulting SAW propagates in the acousto-optic device and the acousto-optic device thereby performs mode conversion of light at a wavelength determined by the resulting SAW,
   wherein the resulting SAW has an extended frequency band greater than the frequency band corresponding to the first SAW and greater than the frequency band corresponding to the second SAW.

20. An acousto-optic device according to claim 19, wherein the acousto-optic device is an acousto-optic tunable filter (AOTF).

21. An acousto-optic tunable filter (AOTF) comprising:
   a first pair of comb electrodes generating a first surface acoustic wave (SAW) having a first range of wavelengths; and
   a second pair of comb electrodes generating a second SAW having a second range of wavelengths different and separate from the first range of wavelengths, wherein
   the first and second SAWs combine in the AOTF to form a resulting SAW that propagates in the AOTF and thereby causes the AOTF to perform mode conversion of light at a wavelength determined by the resulting SAW, and
   the resulting SAW provides a range of wavelengths at which the AOTF is capable of performing mode conversion that is greater than the first or second ranges taken individually.

22. An AOTF as in claim 21, wherein the first and second pairs of comb electrodes are arranged in parallel to each other and along a direction that is perpendicular to a direction in which light propagates through the AOTF.

23. An acousto-optic tunable filter (AOTF) comprising:
   a first pair of comb electrodes generating a first surface acoustic wave (SAW) having a first range of wavelengths;
   a second pair of comb electrodes generating a second SAW having a second range of wavelengths different and separate from the first range of wavelengths;
   means for combining the first and second SAWs in the AOTF to form a resulting SAW that propagates in the AOTF; and
   means for causing the AOTF to perform mode conversion of light at a wavelength determined by the resulting SAW,
   wherein the resulting SAW provides a range of wavelengths at which the AOTF is capable of performing mode conversion that is greater than the first or second ranges taken individually.

* * * * *

UNITED STATES PATENT AND TRADEMARK OFFICE
CERTIFICATE OF CORRECTION

PATENT NO.         : 7,463,795 B2
APPLICATION NO. : 10/981561
DATED              : December 9, 2008
INVENTOR(S)        : Yukito Tsunoda et al.

It is certified that error appears in the above-identified patent and that said Letters Patent is hereby corrected as shown below:

Column 18, Line 67, change "surfacea coustic" to --surface acoustic--.

Column 20, Line 43, change "transduce relectrode" to --transducer electrode--.

Signed and Sealed this

Third Day of March, 2009

JOHN DOLL
*Acting Director of the United States Patent and Trademark Office*